United States Patent
Wirtanen et al.

(10) Patent No.: US 11,146,659 B2
(45) Date of Patent: Oct. 12, 2021

(54) OPTIMIZED TCU TRANSIT POWER

(71) Applicant: FORD GLOBAL TECHNOLOGIES, LLC, Dearborn, MI (US)

(72) Inventors: Jeffrey William Wirtanen, Kanata (CA); Muhammad Khaledul Islam, Ottawa (CA); Yihai Zhang, Kanata (CA)

(73) Assignee: Ford Global Technologies, LLC, Dearborn, MI (US)

( * ) Notice: Subject to any disclaimer, the term of this patent is extended or adjusted under 35 U.S.C. 154(b) by 38 days.

(21) Appl. No.: 16/002,513

(22) Filed: Jun. 7, 2018

(65) Prior Publication Data

US 2019/0379763 A1    Dec. 12, 2019

(51) Int. Cl.
| | |
|---|---|
| H04L 29/08 | (2006.01) |
| H04W 4/14 | (2009.01) |
| H04W 72/08 | (2009.01) |
| H04W 4/40 | (2018.01) |
| H04W 24/08 | (2009.01) |
| H04L 12/26 | (2006.01) |
| H04L 12/28 | (2006.01) |

(52) U.S. Cl.
CPC ............. *H04L 67/34* (2013.01); *H04L 43/16* (2013.01); *H04W 4/14* (2013.01); *H04W 4/40* (2018.02); *H04W 24/08* (2013.01); *H04W 72/085* (2013.01); *H04L 12/2854* (2013.01)

(58) Field of Classification Search
CPC .......... H04L 67/34; H04W 4/40; H04W 4/14; H04W 24/08; H04W 72/085
USPC ........................................................ 455/466
See application file for complete search history.

(56) References Cited

U.S. PATENT DOCUMENTS

| | | | |
|---|---|---|---|
| 7,242,920 B2 | 7/2007 | Morris | |
| 8,713,559 B2 | 4/2014 | Fallon et al. | |
| 2004/0198366 A1* | 10/2004 | Crocker | H04W 76/19 |
| | | | 455/452.1 |
| 2011/0231834 A1 | 9/2011 | Kim | |
| 2012/0108163 A1* | 5/2012 | Bai | H04W 4/06 |
| | | | 455/3.06 |
| 2015/0043384 A1* | 2/2015 | Hui | H04W 40/246 |
| | | | 370/255 |
| 2015/0169311 A1* | 6/2015 | Dickerson | G06F 8/65 |
| | | | 717/170 |
| 2016/0116967 A1 | 4/2016 | Chung et al. | |
| 2016/0196132 A1* | 7/2016 | Searle | H04L 41/082 |
| | | | 717/173 |
| 2017/0026492 A1* | 1/2017 | Kawamura | H04L 67/322 |
| 2017/0300313 A1* | 10/2017 | Gantt, Jr. | G06F 8/65 |

(Continued)

FOREIGN PATENT DOCUMENTS

GB    2569112 A  *  6/2019  ............. H04W 4/44

*Primary Examiner* — Charles N Appiah
*Assistant Examiner* — Nicole M Louis-Fils
(74) *Attorney, Agent, or Firm* — Michael J. Spenner; Brooks Kushman P.C.

(57) ABSTRACT

A vehicle includes a processor, programmed to utilize a modem to receive an update request as a short message service (SMS) message, identify a network quality metric for a data connection to a base station of a wide-area network, when the quality metric exceeds a predefined threshold value, download the software update from the wide-area network, and otherwise, send an update response as an SMS deliver report indicating rejection of the update request.

19 Claims, 3 Drawing Sheets

(56) References Cited

U.S. PATENT DOCUMENTS

2018/0052681 A1\* 2/2018 Pereira Cabral ........ G06F 9/445
2018/0115889 A1\* 4/2018 Todorovic ............. H04W 4/022
2019/0073210 A1\* 3/2019 Sano ................... G06F 9/44505

\* cited by examiner

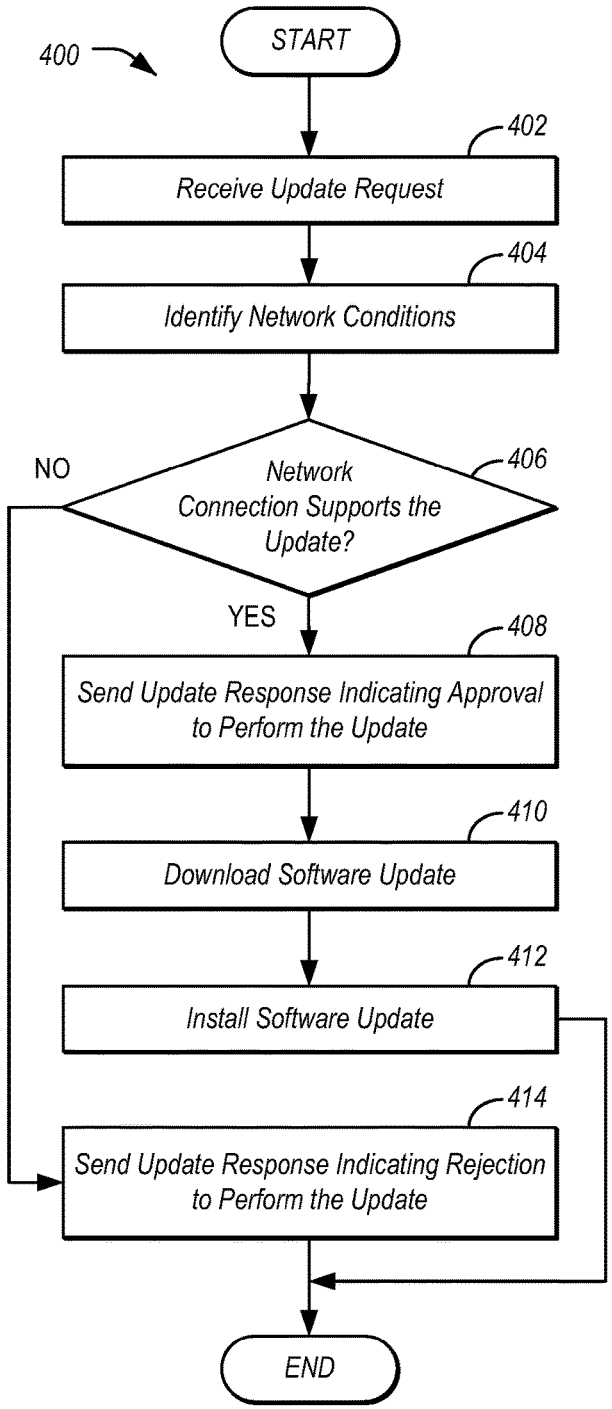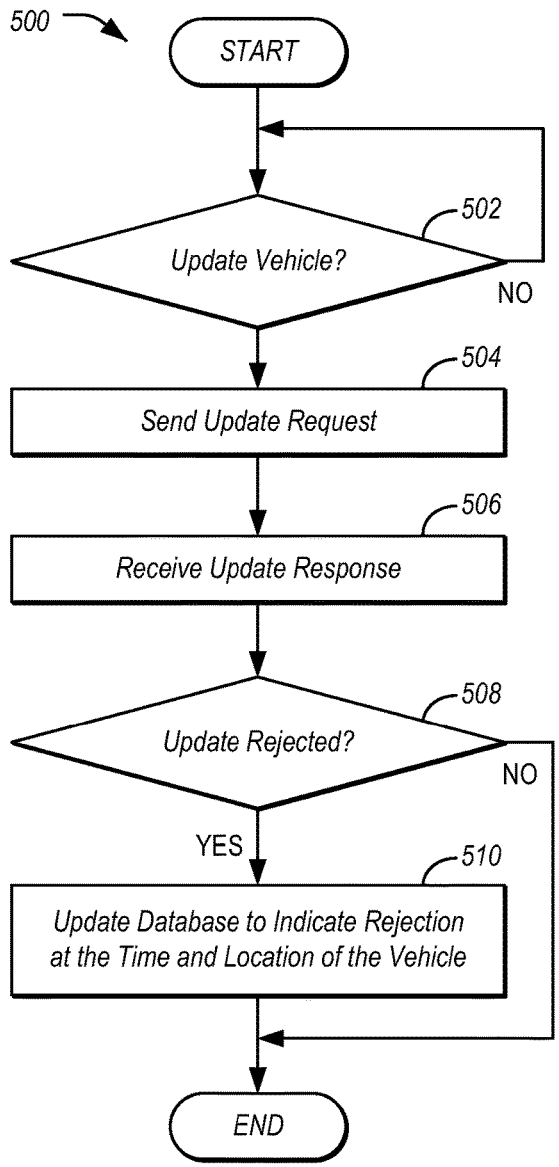
FIG. 4
FIG. 5

OPTIMIZED TCU TRANSIT POWER

TECHNICAL FIELD

Aspects of the disclosure generally relate to optimization of transmit power for vehicle telematics controllers.

BACKGROUND

Modern vehicles include components operated by controllers that execute software. From time to time, the software may require to be updated. Over-the air (OTA) software updating has become increasingly popular for the convenience it provides. In an OTA system, vehicles are instructed to download the new software wirelessly "over the air" from a server. The new software is then installed to the controllers.

SUMMARY

In one or more illustrative examples, a vehicle includes a processor, programmed to utilize a modem to receive an update request as a short message service (SMS) message, identify a network quality metric for a data connection to a base station of a wide-area network, when the quality metric exceeds a predefined threshold value, download the software update from the wide-area network, and otherwise, send an update response as an SMS deliver report indicating rejection of the update request.

In one or more illustrative examples, a method includes responsive to receiving an update request by a vehicle to install a software update as a short message service (SMS) message, identify a network quality metric for a data connection to a base station of a wide-area network; when the quality metric exceeds a predefined threshold value corresponding to the software update, downloading the software update from the wide-area network; and otherwise, sending an SMS deliver report indicating rejection of the update request.

In one or more illustrative examples, a system includes a memory storing a database; and a processor. The processor is programmed to send an update request to a vehicle, receive an update response indicating rejection of the update request and a location of the vehicle, update the database to indicate that the vehicle rejected the update request at the location, and use the database to avoid sending further update requests to the vehicle at the location.

BRIEF DESCRIPTION OF THE DRAWINGS

FIG. 4 illustrates an example process for the installation of software updates by a vehicle; and FIG. 5 illustrates an example process for requesting installation of software to a vehicle by the update server.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Software updates and other lower priority tasks typically occur in the middle of the night (or other times of the day). This takes advantage of the fact that the vehicle is not in use and there are lower cellular (or Wi-Fi) data costs. Sometimes however, the vehicle is parked in a location with poor network, such as garage or an underground lot. If the vehicle is parked in a location with poor network, high transmission power will be required, which can drain the car battery. The difference in power required to transmit in good to poor coverage can be substantial. Accordingly, when a software update is triggered, transmission power level may be useful to identify before determining if a low priority update is worthwhile compared to a high priority update.

An improved approach to software updates may use signal quality metrics to confirm that the connection can be operated within a power budget. This distinguishes from systems that rely on signal strength, because there can be good signal strength but poor throughput due to network congestion. Additionally, because signal quality metrics from a base station are being used, the decision to power up the vehicle systems can be performed before establishing a full connection, reducing key-off load. For instance, the vehicle could reject an update message (e.g., as sent as a short message service (SMS) request) in poor network conditions, without powering up the whole telematics controller or the vehicle controllers to update.

Figure 1:
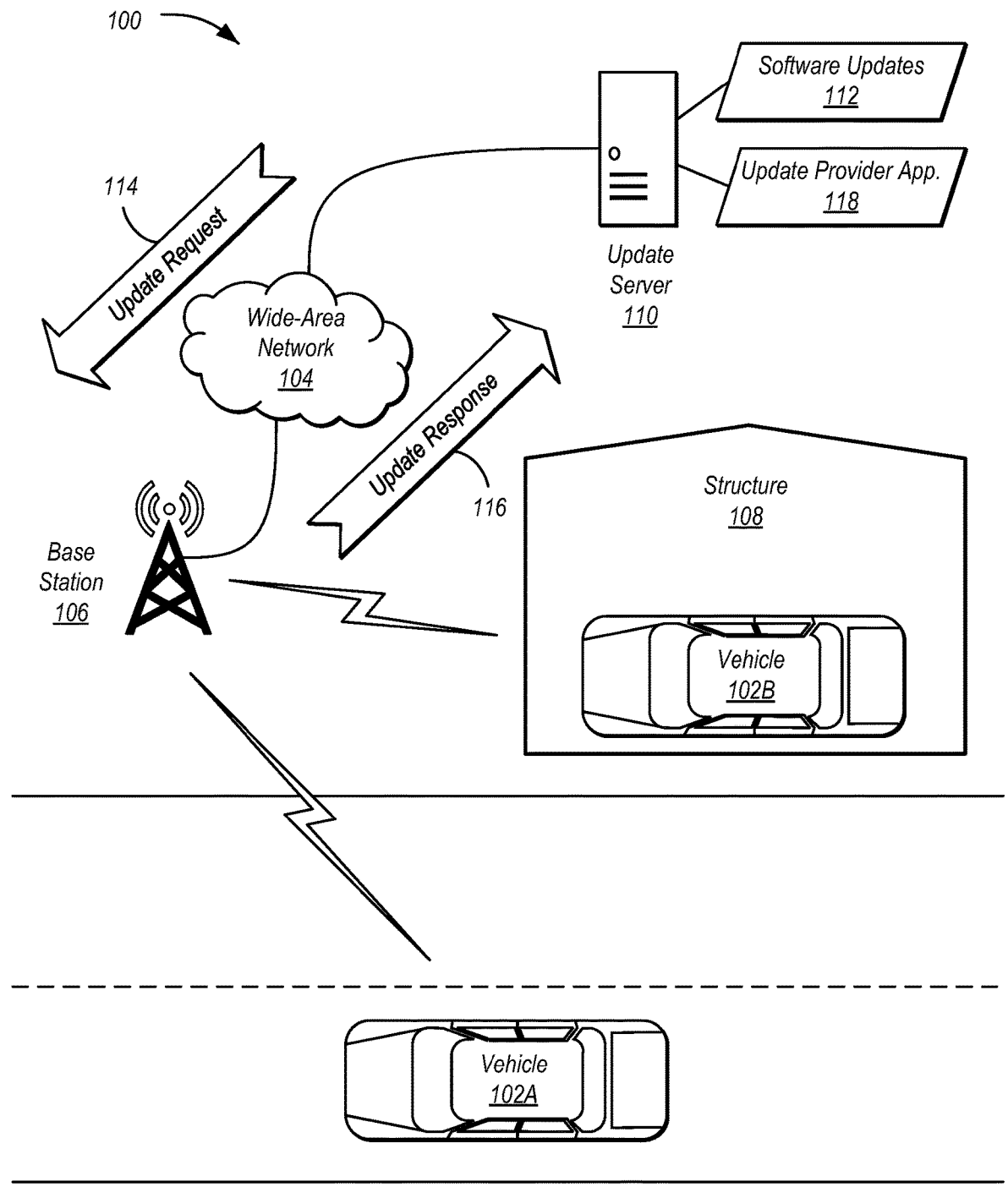
FIG. 1 illustrates an example system for installing software updates to a vehicle.

FIG. 1 illustrates an example system 100 for installing software updates 112 to a vehicle 102. As shown, the system 100 includes vehicles 102A and 102B (collectively 102) in communication with an update server 110 over a wide-area network 104. The vehicle 102 is configured to wirelessly communicate with base stations 106 connected to the wide-area network 104. Only one base station 106 is shown for clarity, but it should be noted that systems 100 typically include many base stations 106 arranged to cover a large geographical area. While an example system 100 is shown in FIG. 1, the example components as illustrated are not intended to be limiting. Indeed, the system 100 may have more or fewer components, and additional or alternative components and/or implementations may be used. As an example, the system 100 may include more or fewer vehicles 102, base stations 106, and/or update servers 110.

The vehicles 102 may include various types of automobile, crossover utility vehicle (CUV), sport utility vehicle (SUV), truck, recreational vehicle (RV), boat, plane or other mobile machine for transporting people or goods. In many cases, the vehicle 102 may be powered by an internal combustion engine. As another possibility, the vehicle 102 may be a hybrid electric vehicle (HEV) powered by both an internal combustion engine and one or more electric motors, such as a series hybrid electric vehicle (SHEV), a parallel hybrid electrical vehicle (PHEV), or a parallel/series hybrid electric vehicle (PSHEV). As the type and configuration of vehicle 102 may vary, the capabilities of the vehicle 102 may correspondingly vary. As some other possibilities, vehicles 102 may have different capabilities with respect to passenger capacity, towing ability and capacity, and storage volume. Further aspects of the functionality of the vehicle 102 are discussed in detail with respect to FIG. 2.

The wide-area network 104 may include one or more interconnected communication networks such as the Internet, a cable television distribution network, a satellite link network, a local area network, and a telephone network, as some non-limiting examples. By accessing the wide-area network 104, the vehicle 102 may be able to send outgoing data from the vehicle 102 to network destinations on the wide-area network 104, and receive incoming data to the vehicle 102 from network destinations on the wide-area network 104.

The base stations 106 may include system hardware configured to allow cellular transceivers of the vehicles 102 to access the communications services of the wide-area network 104. In an example, the base stations 106 may be part of a Global System for Mobile communication (GSM) cellular service provider. In another example, the base stations 106 may be part of a code division multiple access (CDMA) cellular service provider. The base stations 106 may support various different technologies and data speeds.

Signal strength of wireless signals from the base stations 106 to the vehicles 102 may decrease as distance between the base stations 106 to the vehicles 102 increases. Additionally, obstructions between the base stations 106 and the vehicle 102 may further reduce signal strength. For example, signal strength between the base stations 106 and a vehicle 102A traversing a roadway may be greater than signal strength between the base stations 106 and a vehicle 102B located within a structure 108 such as a garage. This may be due to attenuation of the signal by the structure 108, despite the vehicle 102B being physically closer to the base stations 106 than the vehicle 102A is.

The update server 110 may include computing hardware configured to provide data services related to providing software updates 112 to the vehicles 102. The software updates 112 may include updates to firmware, software, and/or settings of the vehicle 102. Further aspects of the functionality of the update server 110 are discussed in detail with respect to FIG. 3.

An update request 114 is a message sent from the update server 110 to the vehicle 102 to indicate that this is a software update 112 that should be installed to the vehicle 102. For instance, the update request 114 may include an identifier or other indication of a specific software update 112 to be installed. In some examples, the update request 114 may further include a priority of an update, such as that an update is critical and should be installed as soon as possible, or that an update is low priority and can be deferred. Or, the update request 114 may simply indicate to the vehicle 102 that the vehicle 102 should connect to the update server 110 via a data connection to determine what software updates 112 should be installed. In an example, the message may be sent to a phone number of the vehicle 102 via short message server (SMS). In other examples, however, the message may be sent to an Internet Protocol address of the vehicle 102 over a data connection.

An update response 116 is a message sent from the vehicle 102 in response to receipt by the vehicle 102 of the update request 114. The update response 116 may indicate information from the vehicle 102 related to the reception of the update request 114. In an example, the update response 116 may indicate an acknowledgement that the vehicle 102 will attempt the update. In another example, the update response 116 may indicate that the vehicle 102 will not attempt the update.

In yet a further example, the update response 116 may indicate information explaining why the vehicle 102 may not attempt the update. For instance, such information may indicate that the vehicle 102 is in an area of poor network connectivity.

An update provider application 118 may be an example of an application installed to the update server 110. When executed by the update server 110, the update provider application 118 may be configured to send update requests 114 to the vehicle 102, as well as receive updates responses 116 from the vehicle 102. Further aspects of the operation of the update provider application 118 are discussed in detail below.

Figure 2:
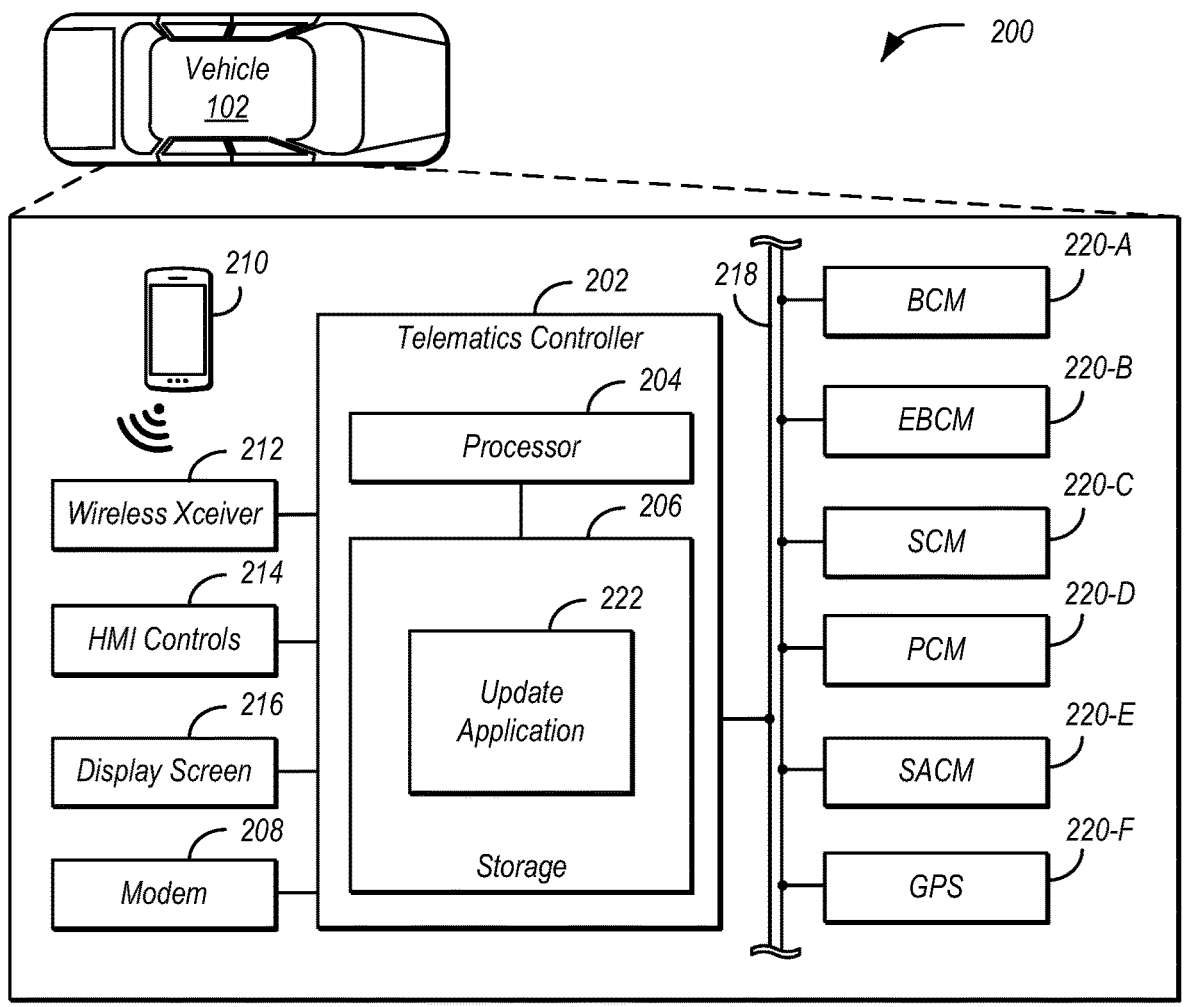
FIG. 2 illustrates an example diagram of the vehicle implementing communications features for use in installing software updates.

FIG. 2 illustrates an example diagram 200 of the vehicle 102 implementing communications features for use in installing software updates 112. The vehicle 102 includes a telematics controller 202 configured to communicate over the wide-area network 104. This communication may be performed using a modem 208 of the telematics controller 202. While an example vehicle 102 is shown in FIG. 2, the example components as illustrated are not intended to be limiting. Indeed, the vehicle 102 may have more or fewer components, and additional or alternative components and/or implementations may be used.

The telematics controller 202 may be configured to support voice command and BLUETOOTH interfaces with the driver and driver carry-on devices (e.g., mobile devices 210), receive user input via various buttons or other controls, and provide vehicle status information to a driver or other vehicle 102 occupants. An example telematics controller 202 may be the SYNC system provided by FORD MOTOR COMPANY of Dearborn, Mich.

The telematics controller 202 may further include various types of computing apparatus in support of performance of the functions of the telematics controller 202 described herein. In an example, the telematics controller 202 may include one or more processors 204 configured to execute computer instructions, and a storage 206 medium on which the computer-executable instructions and/or data may be maintained. A computer-readable storage medium (also referred to as a processor-readable medium or storage 206) includes any non-transitory (e.g., tangible) medium that participates in providing data (e.g., instructions) that may be read by a computer (e.g., by the processor(s) 204). In general, a processor 204 receives instructions and/or data, e.g., from the storage 206, etc., to a memory and executes the instructions using the data, thereby performing one or more processes, including one or more of the processes described herein. Computer-executable instructions may be compiled or interpreted from computer programs created using a variety of programming languages and/or technologies, including, without limitation, and either alone or in combination, JAVA, C, C++, C #, FORTRAN, PASCAL, VISUAL BASIC, PYTHON, JAVA SCRIPT, PERL, PL/SQL, etc.

The telematics controller 202 may be configured to communicate with mobile devices 210 of the vehicle occupants. The mobile devices 210 may be any of various types of portable computing device, such as cellular phones, tablet computers, smart watches, laptop computers, portable music players, or other devices capable of communication with the telematics controller 202. As with the telematics controller 202, the mobile device 210 may include one or more processors configured to execute computer instructions, and a storage medium on which the computer-executable instructions and/or data may be maintained. In many examples, the telematics controller 202 may include a wireless transceiver 212 (e.g., a BLUETOOTH controller, a ZIGBEE transceiver, a Wi-Fi transceiver, etc.) configured to communicate with a compatible wireless transceiver of the mobile device 210. Additionally, or alternately, the telematics controller 202 may communicate with the mobile device 210 over a wired connection, such as via a USB connection between the mobile device 210 and a USB subsystem of the telematics controller 202.

The telematics controller 202 may also receive input from human-machine interface (HMI) controls 214 configured to provide for occupant interaction with the vehicle 102. For instance, the telematics controller 202 may interface with one or more buttons or other HMI controls 214 configured to invoke functions on the telematics controller 202 (e.g., steering wheel audio buttons, a push-to-talk button, instrument panel controls, etc.). The telematics controller 202 may also drive or otherwise communicate with one or more display screens 216 configured to provide visual output to vehicle occupants, e.g., by way of a video controller. In some cases, the display 216 may be a touch screen further configured to receive user touch input via the video controller, while in other cases the display 216 may be a display only, without touch input capabilities. In an example, the display 216 may be a head unit display included in a center console area of the vehicle 102 cabin. In another example, the display 216 may be a screen of a gauge cluster of the vehicle 102.

The telematics controller 202 may be further configured to communicate with other components of the vehicle 102 via one or more in-vehicle networks 218. The in-vehicle networks 218 may include one or more of a vehicle controller area network (CAN), an Ethernet network, or a media oriented system transfer (MOST), as some examples. The in-vehicle networks 218 may allow the telematics controller 202 to communicate with other vehicle 102 systems, such as a body controller (BCM) 220-A, an electronic brake control system (EBCM) 220-B, a steering control system (SCM) 220-C, a powertrain control system (PCM) 220-D, a safety control system (SACM) 220-E, and a global positioning system (GPS) 220-F. As depicted, the controllers 220 are represented as discrete controllers and systems. However, the controllers 220 may share physical hardware, firmware, and/or software, such that the functionality from multiple controllers 220 may be integrated into a single controller 220, and that the functionality of various such controllers 220 may be distributed across a plurality of controllers 220.

The BCM 220-A may be configured to support various functions of the vehicle 102 related to control of current loads feeding off the vehicle 102 battery. Examples of such current loads include, but are not limited to, exterior lighting, interior lighting, heated seats, heated windshield, heated backlight, and heated mirrors. Additionally, the BCM 220-A may be configured to manage vehicle 102 access functions, such as keyless entry, remote start, and point of access status verification (e.g., closure status of the hood, doors and/or trunk of the vehicle 102).

The EBCM 220-B may be configured to control braking functions of the vehicle 102. In some examples, the EBCM 220-B may be configured to receive signal information from vehicle wheel sensors and/or drivetrain differentials, and manage anti-lock and anti-skid brake functions through control of brake line valves that adjust brake pressure from the master cylinder.

The SCM 220-C may be configured to aid in vehicle steering by augmenting or counter-acting steering effort provided by the vehicle 102 wheels. In some cases, the augmented steering effort may be provided by a hydraulic steering assist configured to provide controlled energy to the steering mechanism, while in other cases the augmented steering effort may be provided by an electric actuator system.

The PCM 220-D may be configured to perform engine control and transmission control functions for the vehicle 102. With respect to engine control, the PCM 220-D may be configured to receive throttle input and control actuators of the vehicle engine to set air/fuel mixture, ignition timing, idle speed, valve timing, and other engine parameters to ensure optimal engine performance and power generation. With respect to transmission control, the PCM 220-D may be configured to receive inputs from vehicle sensors such as wheel speed sensors, vehicle speed sensors, throttle position, transmission fluid temperature, and determine how and when to change gears in the vehicle 102 to ensure adequate performance, fuel economy, and shift quality. The PCM 220-D may further provide information over the in-vehicle networks 218, such as vehicle speed and engine RPM.

The SACM 220-E may be configured to provide various functions to improve the stability and control of the vehicle 102. As some examples, the SACM 220-E may be configured to monitor vehicle sensors (e.g., steering wheel angle sensors, yaw rate sensors, lateral acceleration sensors, wheel speed sensors, etc.), and control the BCM 220-A, SCM 220-C, and/or PCM 220-D. As some possibilities, the SACM 220-E may be configured to provide throttle input adjustments, steering angle adjustments, brake modulation, and all-wheel-drive power split decision-making over the in-vehicle network 218 to improve vehicle stability and controllability. It should be noted that in some cases, the commands provided by the SACM 220-E may override other command input. The GPS 220-F is configured to provide vehicle 102 current location and heading information for use in vehicle 102 services.

An update installer application 222 may be an application installed to the memory of the telematics controller 202. When executed by the processor 204, the update installer application 222 may cause the telematics controller 202 to receive update requests 114 from the update server 110, identify network conditions of the vehicle 102, provide update responses 116 to the update server 110, and install the software updates 112 when network conditions are conducive to the updating of the vehicle 102.

Figure 3:
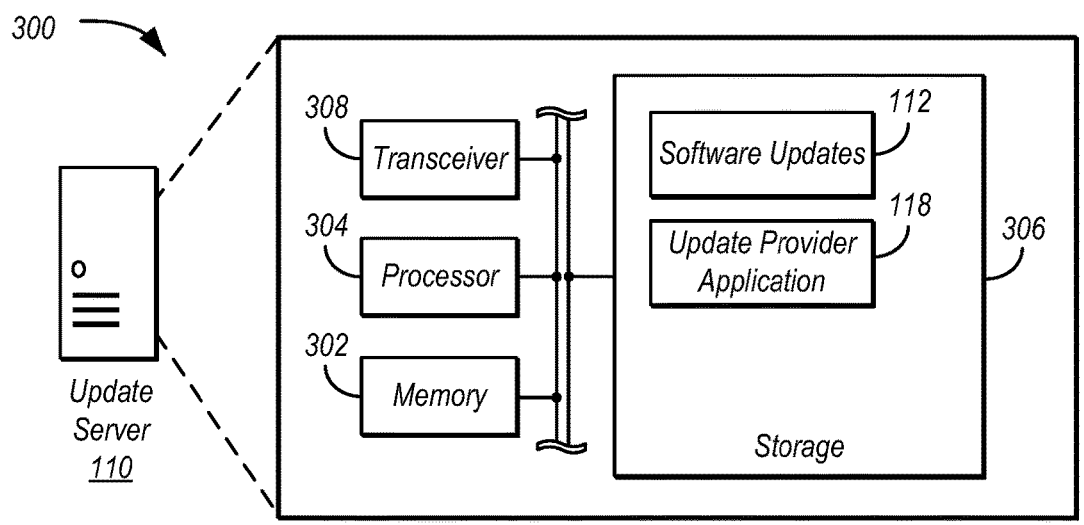
FIG. 3 illustrates an example of the update server implementing facilities for providing software updates.

FIG. 3 illustrates an example diagram 300 of the update server 110 implementing facilities for providing software updates 112. The update server 110 may include and/or communicate with various types of computing apparatus to facilitate the performance of the update server 110 functions. As shown, the update server 110 includes one or more memories 302 and processors 304 configured to execute computer instructions, and a storage medium 306 on which the computer-executable instructions and/or data may be maintained.

The update server 110 also includes a transceiver 308 to allow the update server 110 to connect to the wide-area network 104 and communicate over the wide-area network 104 with other devices. The transceiver 308 may include, for example, a modem device. For instance, the transceiver 308 may facilitate communication with the modem 208 of the vehicle 102 and/or with the mobile devices 210.

The software updates 112 and update provider application 118 may be stored to one or more storages 306 of the update server 110. The software updates 112 may be categorized in the storage 306 according to importance. In one example, the updates may be categorized as one of critical, medium, and low importance.

As mentioned above, the update provider application 118 may be an application installed to the storage 306 of the update server 110. When executed by the update server 110, the update provider application 118 may be configured to send update requests to vehicles 102, and receive information from the vehicle 102 indicative of whether network conditions are conducive to the installation of software updates 112 to the vehicle 102.

FIG. 4 illustrates an example process 400 for the installation of software updates 112 by a vehicle 102. In an example, the process 400 may be initiated at operation 402 responsive to the vehicle 102 receiving an update request 114. In an example, the update request 114 may be received by the vehicle 102 from the update server 110. In many examples, the update request 114 may be sent via SMS to the phone number of the modem 208 of the vehicle 102. The update request 114 may include an identifier or other indication of a specific software update 112 to be installed. Or, the update request 114 may simply indicate to the vehicle 102 that the vehicle 102 should connect to the update server 110 via a data connection to determine what software updates 112 should be installed.

At 404, the vehicle 102 identifies network conditions. In an example, responsive to receipt of the update request 114 by the telematics controller 202, the telematics controller 202 may attempt to determine the quality of a data connection that may be available to the wide-area network 104. For example, the telematics controller 202 may measure one or more of latency, throughput, or packet loss. In another example, the telematics controller 202 may receive an indication of the amount of congestion at the base station 106 to which the modem 208 of the vehicle 102 is connected. Notably, the determination of network conditions may be made without requiring the modem 208 and telematics controller 202 to expend the full energy required to form a full data connection to the wide-area network 104 via the base stations 106, and without waking other vehicle 102 components.

In yet a further example, the telematics controller 202 may maintain information indicative of the quality metrics of the last known connection made by the modem 208 to the wire-area network 104 (e.g., stored to the storage 206), and may retrieve that information without having to reconnect to the wide-area network 104. This stored information may be useful, for instance, to record that the vehicle 102 entered a structure 108 or other area in which signal strength and quality is diminished. If such an approach is used, then power would also not need to be expended to use the modem 208 to query the base stations 106 at all.

At operation 406, the vehicle 102 determines whether the network connection supports the download of software updates 112 to the vehicle 102. For example, based on the network conditions determined by the telematics controller 202 at operation 404, the telematics controller 202 may determine whether or not software updates 112 should be installed. If the network connection is poor, then the vehicle 102 may expend unnecessary key-off power load attempting to download a software update 112.

Poor network conditions may be identified, in an example, based on threshold values for latency, throughput, packet loss, congestion, or other quality of service measurements made at operation 404. Additionally, the priority of the software update 112 may also be considered. For instance, the vehicle 102 may elect to always attempt to install critical updates, but may compare the network conditions to a first set of threshold values to confirm that network conditions are adequate for installing medium priority updates. The vehicle 102 may also use a second set of threshold values to confirm that network conditions are adequate for installing low priority updates. In other words, if an update is low priority, the connection may be required to be a better-quality connection that requires less power draw than if the update is a higher priority update.

Notably, there is a direct correlation between the received signal quality (e.g., RRSP in LTE, RSCP in UMTS) and the required transmit power. RF power amplifiers utilize power management techniques such as Average Power Tracking (APT) and Envelope Tracking (ET) to manage the power of the power amplifier (PA) in relation to the required transmit power. The required increase in power from the battery to increase the transmit power over the air is not a linear curve and may be exponential. Thus, in power required in poor coverage versus good coverage may be an increase of many times. Each radio may have a different power curve. A power curve of a modem 208/telematics controller 202 for transmit power may be determined by making measurements in the identified conditions, and the signal quality as measured can be correlated to the power usage. This correlation can then be used to determine the power cost of a potential data transmission before it occurs. Thus, downloads or tasks can be prioritized. A first power curve may be applied to cellular transmission, while a second power curve may be applied to Wi-Fi once Wi-Fi is more controlled (e.g., 802.11n).

Thus, in some examples, the power usage for a download may be compared to a minimum reserve power threshold. For example, X % of battery charge may be available by the vehicle 102 and the required power for the download could be estimated to determine if download should go ahead. In an example, the threshold may be an amount of traction battery capacity such that the vehicle 102 could still start. In another example, for an electric vehicle 102 the threshold may be an amount of charge sufficient to allow the vehicle 102 to drive a specific distance (e.g., according to an individual's driving patterns time of day, distance, etc.).

If the network connection is determined to support the download of the software updates 112, control passes to operation 408. If not, control passes to operation 414.

At 408, the vehicle 102 sends an update response 116 to the update server 110 indicating approval to perform the update. In an example, the update response 116 may be an SMS message returned to the origin telephone number of the SMS message received at operation 402. If SMS is used, then the update request 114 may be sent to the vehicle 102 without requiring a data connection to be present. In another example, the update response 116 may be a data message returned to the origin IP address of the IP message received at operation 402. In the case of SMS, the update response 116 may be a SMS deliver response.

The vehicle 102 downloads the software update 112 from the update server 110 at 410. In an example, the telematics controller 202 establishes a data connection with the update server 110 over the wide-area network 104 (or uses an existing data connection), and downloads the software update 112.

At operation 412, the vehicle 102 installs the software update 112. In an example, the update installer application 222 of the telematics controller 202 sends the software update 112 over the in-vehicle network 218 to the ECU 220 to be updated. After operation 412, the process 400 ends.

At 414, the vehicle 102 sends an update response 116 to the update server 110 indicating rejection to perform the update. Similar to as discussed above with respect to operation 408, the update response 116 may be an SMS message returned to the origin telephone number of the SMS message received at operation 402. In another example, the update response 116 may be a data message returned to the origin IP address of the IP message received at operation 402.

In the case of SMS, the update response 116 may be a SMS deliver response with a payload indicating that the network connection is insufficient to perform the update. The payload may specify information such as the power draw required to support a data connection at the current vehicle 102 location and time, and/or information indicative of the quality metrics of a connection at the current vehicle 102 location and time. Further aspects of using SMS deliver responses to return status codes is discussed in detail in U.S. patent application Ser. No. 15/944,941, titled "SMS Indication Application Response Reporting," which is incorporated herein by reference in its entirety.

In the case of IP, the update response 116 may be an IP control plane signaling message including an additional data exchange to provide the information for the response. Similarly, the payload may specify information such as the power draw required to support a data connection at the current vehicle 102 location and time, and/or information indicative of the quality metrics of a connection at the current vehicle 102 location and time.

In addition to signal quality, size of the download may be considered as well. For example, X % of battery charge may be available by the vehicle 102 and the required power for the download could be estimated to determine if download should go ahead. A power budget then may be calculated using the power curve of the modem 208/telematics controller 202 to determine whether the battery would have sufficient charge above a threshold amount after the download. In an example, the threshold may be an amount of traction battery capacity such that the vehicle 102 could still start. In another example, for an electric vehicle 102 the threshold may be an amount of charge sufficient to allow the vehicle 102 to drive a specific distance (e.g., according to an individual's driving patterns time of day, distance, etc.).

Notably, by avoiding performing updates in conditions where the power usage does not make sense given the priority of the software update 112 and the power required to download the update, the vehicle 102 may avoid spending power budget on attempting software updating during conditions where such updates cannot or need not be downloaded. After operation 414, the process 400 ends.

FIG. 5 illustrates an example process 500 for requesting installation of software updates 112 to a vehicle 102 by the update server 110. At operation 502, the update server 110 determines whether to update the vehicle 102. In an example, the update server 110 may determine to update the vehicle 102 based on criteria, such as occurrence of a predefined number of miles being driven as reported by the vehicle 102, expiration of a timeout for the vehicle 102 (e.g., 30 days), and/or receipt of a new software update 112 to the update server 110. If the update server 110 determines to update the vehicle 102, control passes to operation 504.

At operation 504, and as discussed above with respect to operation 402, the update server 110 sends an update request 114 to the vehicle 102.

At operation 506, the update server 110 receives an update response 116 from the vehicle 102. In an example, the update response 116 may be sent from the vehicle 102 as discussed above with respect to operations 408 and 414 of the process 400.

At 508, the update server 110 determines whether the update was rejected. In an example, the update server 110 may determine from the update response 116 whether a status code or other information included in the update response 116 indicates that the update was rejected. For instance, the update response 116 may indicate that network conditions were insufficient to download software updates 112. If the update was rejected, control passes to operation 510.

At operation 510, the update server 110 updates a database to indicate the rejection to perform updates at the location of the vehicle 102. The database may be used, for example, to identify locations and times where software update are unlikely to be successful. In one example, this information may be used to prevent the update server 110 from sending update requests 114 when the vehicle 102 is at a location and time where software updating has historically not been available. By avoiding sending such update requests 114, the update server 110 may allow the vehicle 102 to avoid spending power budget on attempting software updating during conditions where such updates cannot be downloaded. After operation 510, the process 500 ends.

Accordingly, the vehicle 102 rejects update requests 114 (e.g., as sent as a short message service (SMS) request) in poor network conditions, without powering up the whole telematics controller 202 or the vehicle controllers 220 to update. Thus, by using signal quality metrics from the base station 106, the decision to power up the vehicle systems can be performed before establishing a full connection, reducing key-off load. This avoids situations where software updating is attempted by a vehicle 102 while the vehicle 102 is parked in a location with poor cellular coverage.

In general, computing systems and/or devices, such as telematics controller 202, controllers 220, and update server 110, may employ any of a number of computer operating systems, including, but by no means limited to, versions and/or varieties of the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OS X and iOS operating systems distributed by Apple Inc. of Cupertino, Calif., the BlackBerry OS distributed by Research In Motion of Waterloo, Canada, and the Android operating system developed by the Open Handset Alliance.

Computing devices such as the telematics controller 202, controllers 220, and update server 110, generally include computer-executable instructions that may be executable by one or more processors of the computing devices. Computer-executable instructions may be compiled or interpreted from computer programs created using a variety of programming languages and/or technologies, including, without limitation, and either alone or in combination, JAVA™, C, C++, VISUAL BASIC, JAVA SCRIPT, PERL, etc. In general, a processor or microprocessor receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computing device). Such a medium may take many forms, including, but not limited to, non-volatile media and volatile media. Non-volatile media may include, for example, optical or magnetic disks and other persistent memory. Volatile media may include, for example, dynamic random-access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein. Some or all of the operations disclosed herein as being performed by the telematics controller 202, controllers 220, and update server 110 may be such computer program products (e.g., the update provider application 118, the update installer application 222, etc.). In some examples, these computer program products may be provided as software that when executed by one or more processors provides the operations described herein. Alternatively, the computer program products may be provided as hardware or firmware, or combinations of software, hardware, and/or firmware.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle comprising:
    a memory configured to store
        a first set of threshold values of network quality metrics for confirming network conditions are adequate for installing software updates of a first priority, the first priority being indicative of a first importance of installation to the vehicle,
        a second set of threshold values of the network quality metrics for confirming the network conditions are adequate for installing software updates second priority, the second priority being indicative of a second importance of installation to the vehicle, the first importance being greater than the second importance, the second set of threshold values requiring better quality network conditions than the first set of threshold values; and
    a processor, programmed to utilize a modem to
        responsive to receipt of an update request indicating a software update for download, identify a priority of the software update and the network quality metrics for a data connection to a base station of a wide-area network,
        compare the network quality metrics to the first set of threshold values if the priority of the software update is the first priority,
        compare the network quality metrics to the second set of threshold values if the priority of the software update is the second priority,
        responsive to the network quality metrics of the data connection exceeding the compared threshold values, download the software update from the wide-area network utilizing the data connection, and
        otherwise, send an update response indicating rejection of the update request.

2. The vehicle of claim 1, wherein the processor is further programmed to:
    receive the update request as a short message service (SMS) message, and
    send the update response as an SMS deliver report.

3. The vehicle of claim 1, wherein the processor is further programmed to:
    receive the update request as an Internet protocol (IP) message, and
    send the update response using IP control plane signaling.

4. The vehicle of claim 1, wherein the processor is further programmed to identify the network quality metrics according to information regarding a previous connection made by the modem to the wide-area network, without reconnection to the wide-area network.

5. The vehicle of claim 1, wherein the network quality metrics include congestion of the base station.

6. The vehicle of claim 1, wherein the network quality metrics include one or more of latency, throughput, or packet loss, the second threshold values requiring a higher quality connection than the first threshold values in terms of latency, throughput, or packet loss as the importance of the installation of the software update decreases.

7. The vehicle of claim 1, wherein the update response is configured to include the network quality metrics and an indication of a location of the vehicle.

8. The vehicle of claim 1, wherein the processor is further programmed to install the software update.

9. A method comprising:
    storing, in a memory, a first set of threshold values of network quality metrics for confirming network conditions are adequate for installing software updates of a first priority, the first priority being indicative of a first importance of installation to a vehicle;
    storing, in the memory, a second set of threshold values of the network quality metrics for confirming the network conditions are adequate for installing software updates of a second priority, the second priority being indicative of a second importance of installation to the vehicle, the first importance being greater than the second importance, the second set of threshold values requiring better quality network conditions than the first set of threshold values;
    responsive to the vehicle receiving an update request to install a software update as a short message service (SMS) message, identifying a priority of the software update and a network quality metric for a data connection to a base station of a wide-area network;
    comparing the network quality metric to the first set of threshold values if the priority of the software update is the first priority;
    comparing the network quality metrics to the second set of threshold values if the priority of the software update is the second priority;
    responsive to the network quality metric of the data connection exceeding the predefined threshold value corresponding to the priority of the software update, downloading the software update from the wide-area network utilizing the data connection; and otherwise, sending an SMS deliver report indicating rejection of the update request.

10. The method of claim 9, further comprising identifying the network quality metric according to information regarding a previous connection made by a modem of the vehicle to the wide-area network, without reconnection to the wide-area network.

11. The method of claim 10, wherein the network quality metric includes one or more of congestion of the base station, latency, throughput, or packet loss, the second threshold value requiring a higher quality connection than the first threshold value in terms of the congestion of the base station, latency, throughput, or packet loss as the importance of the installation of the software update decreases.

12. The method of claim 10, wherein the SMS deliver report includes the quality metric and an indication of a location of the vehicle.

13. The method of claim 10, further comprising:
utilizing the network quality metric to identify an expected power consumption for downloading the software update, the expected power consumption being computed according to a power curve indicating power consumption of the vehicle in relation to transmit power required for performing the download at a current value of the network quality metric of the connection; and
rejecting the update request responsive to the expected power consumption depleting a battery of the vehicle to below a predefined threshold value.

14. A system comprising:
a memory configured to store
a first set of threshold values of network quality metrics for confirming network conditions are adequate for installing software updates of a first priority, the first priority being indicative of a first importance of installation of a software update to a vehicle,
a second set of threshold values of the network quality metrics for confirming the network conditions are adequate for installing software updates of a second priority, the second priority being indicative of a second importance of the installation of the software update to the vehicle, the first importance being greater than the second importance, the second threshold value requiring better quality network conditions than the first threshold value, and
a database; and
a processor, programmed to
send an update request to the vehicle, the update request indicating one of the first priority or the second priority as an update priority of the software update indicated for download by the vehicle,
receive an update response indicating rejection of the update request and a location of the vehicle, the rejection being made responsive to a network quality metric of a data connection of the vehicle failing to exceed the threshold value corresponding to the update priority,
update the database to indicate that the vehicle rejected the update request at the location, and
use the database to avoid sending further update requests to the vehicle at the location.

15. The system of claim 14, wherein the processor is further programmed to:
send the update request as a short message service (SMS) message, and
receive the update response as an SMS deliver report.

16. The system of claim 14, wherein the processor is further programmed to:
send the update request as an Internet protocol (IP) message, and
receive the update response using IP control plane signaling.

17. The system of claim 14, wherein the update response includes the network quality metric indicative of network conditions at the vehicle, and the processor is further programmed to store the network quality metric in the database in association with the location.

18. The system of claim 14, wherein the update request includes an identifier of a software update to install.

19. The system of claim 14, wherein the update request includes a priority of a software update to install for use by the vehicle in determining whether to accept or reject the update request.

* * * * *